April 6, 1937.  E. PICK  2,076,322
WATER FILTER BATTERY CONTROL
Filed Jan. 2, 1936  6 Sheets-Sheet 3

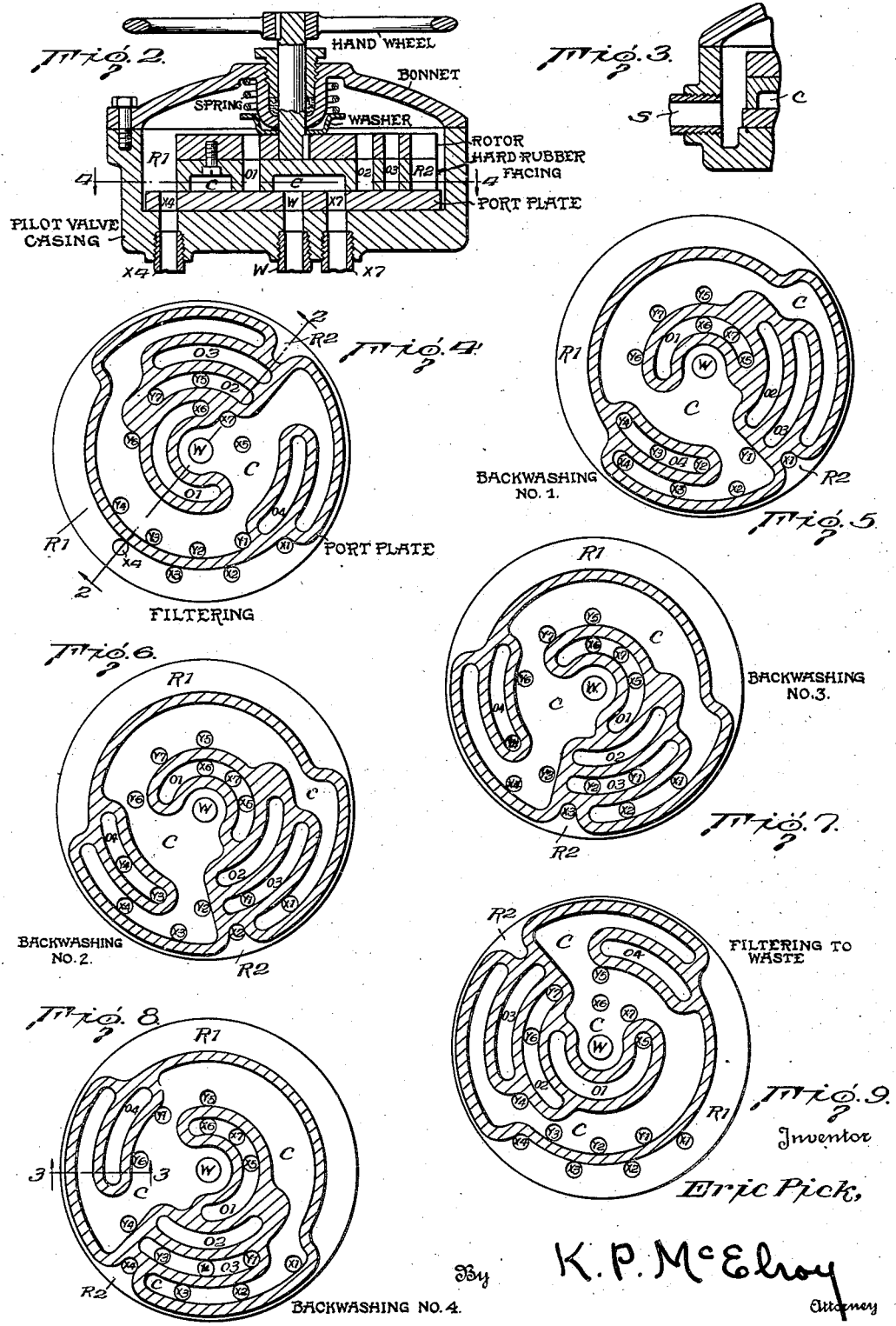

BACKWASHING EACH FILTER WITH WATER PRE-FILTERED IN THE OTHER FILTERS OF THE BATTERY

FILTERING

BACKWASHING NO. 1

BACKWASHING NO. 2

BACKWASHING NO. 3

FILTERING TO WASTE

Inventor
Eric Pick,
By K. P. McElroy
Attorney

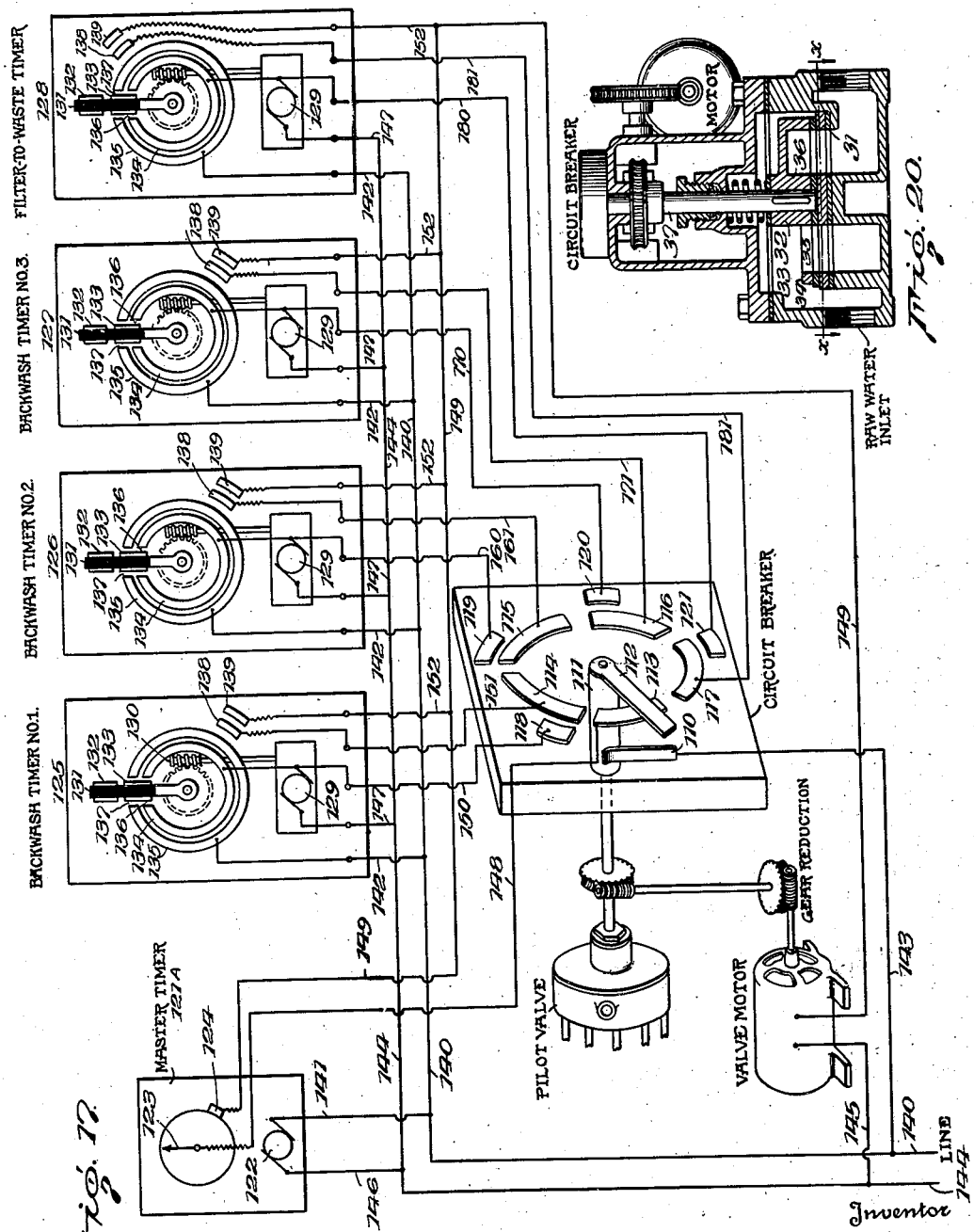

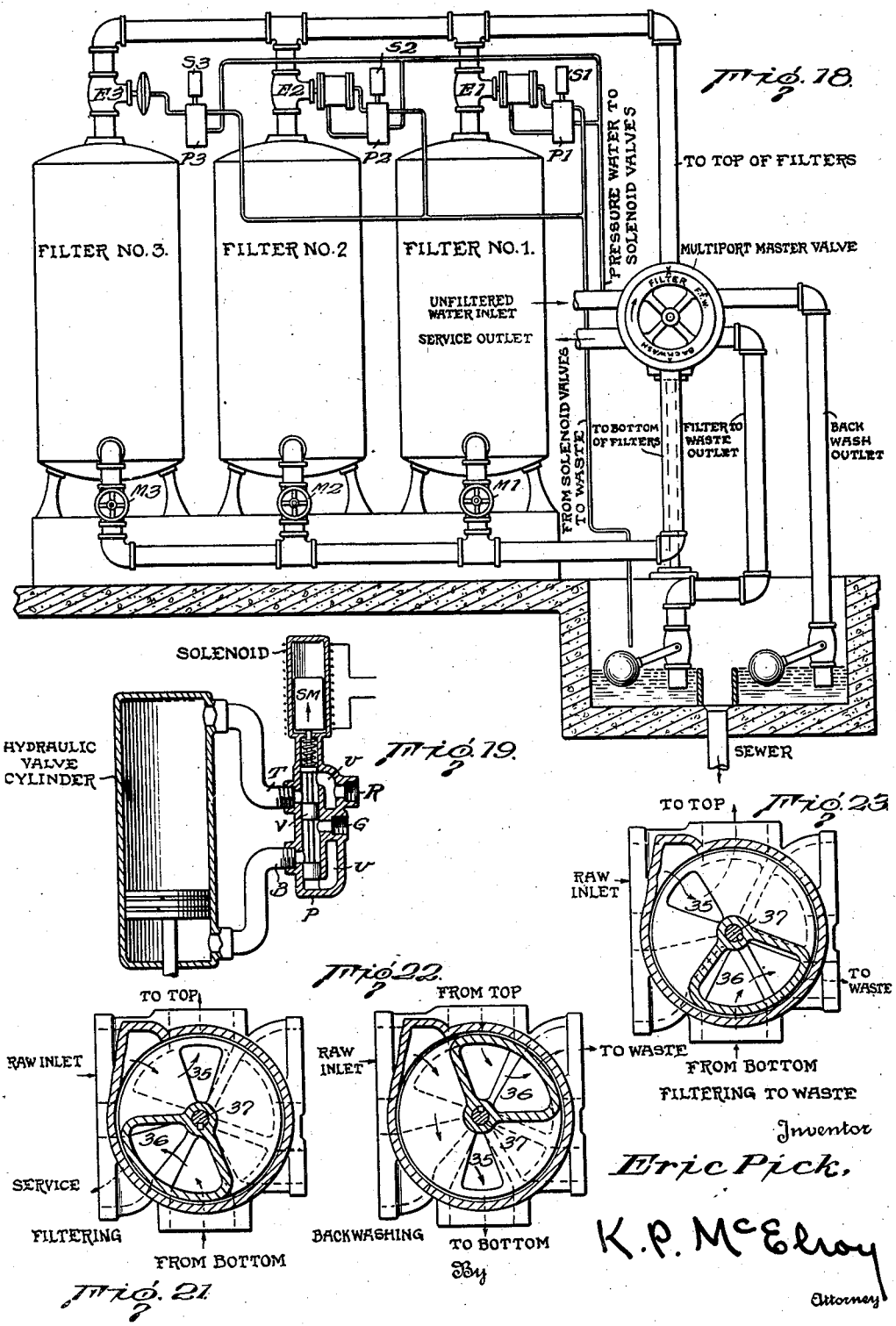

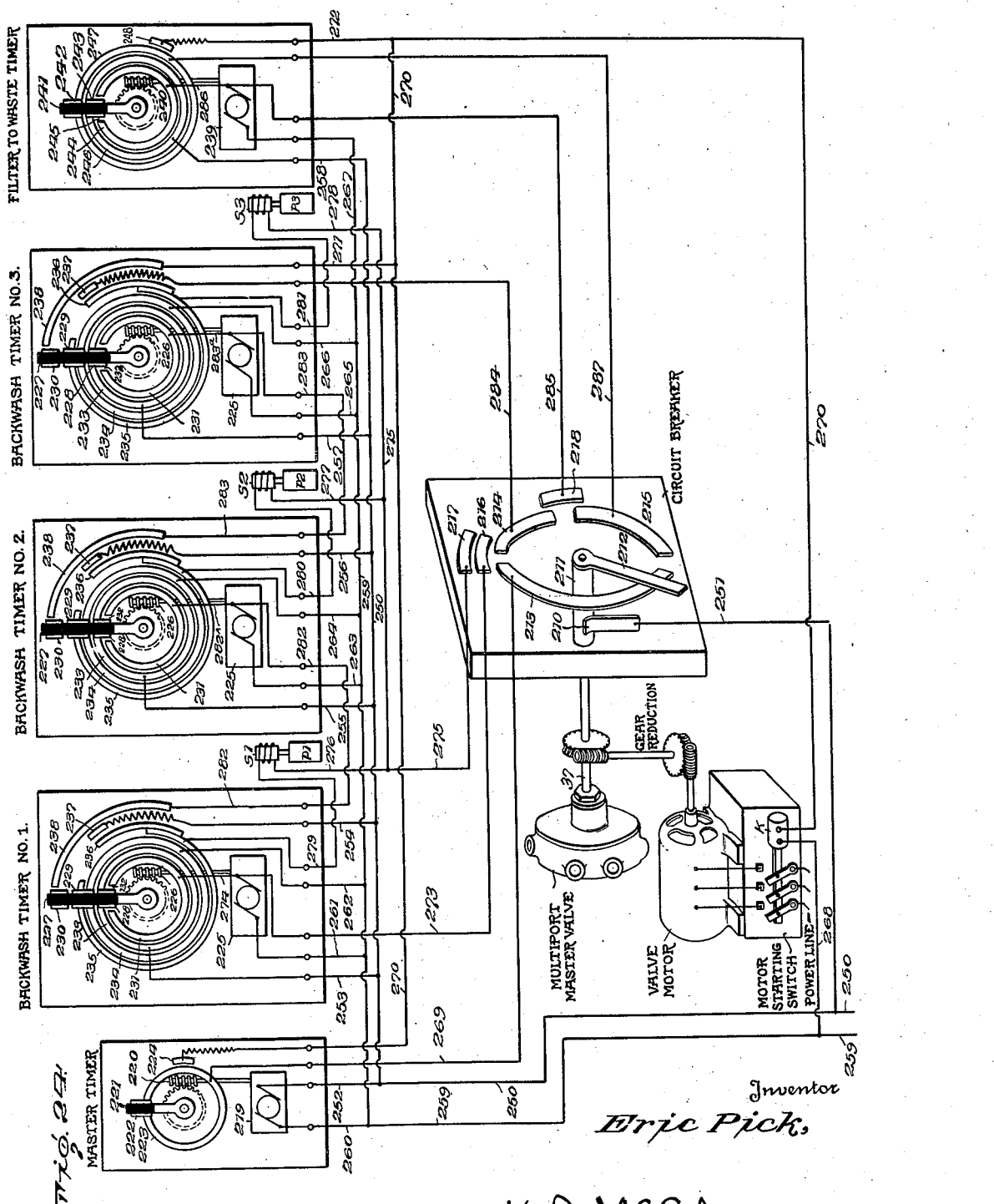

Patented Apr. 6, 1937

2,076,322

UNITED STATES PATENT OFFICE 2,076,322

WATER FILTER BATTERY CONTROL

Eric Pick, New York, N. Y., assignor to The Permutit Company, New York, N. Y., a corporation of Delaware Application January 2, 1936, Serial No. 57,298

10 Claims. (Cl. 210—132)

This invention relates to water filter battery control; and it comprises a plurality of filter units arranged in a battery with coordinated operation and control wherein master valve means control all units of the battery as a whole and the several units are controlled by a plurality of individual valves, coordinated operation of the various units being effected by power means operating both the master valve means and the individual valves with centralized control means whereby the valves are set in a first or filtering position to establish downward flow of water through all the filters of the battery and to service, then in a plurality of successive backwashing positions to shut off the flow to service and to pass an upward backwash flow through one filter at a time to waste and in a final or filter-to-waste valve position to pass water downwardly through all the filters to waste while cutting off flow to service; and the centralized control means advantageously comprises hydraulic operation of both individual and master valve means with a common rotary multiway pilot valve which may be rotated by an electric motor under control by constant speed electric motor and switch means timing the several backwashing flows and the filter-to-waste flow; all as more fully hereinafter set forth and as claimed.

In the operation of filters for purifying liquids such as water with utilization of sand or similar material as the filtering medium, it is necessary to recondition the filter bed when it becomes clogged with dirt, solid matter and slime removed from the liquid. The usual practice is to backwash the filter by a more or less turbulent reversed flow of water which carries off the accumulated dirt and loosens the filter bed with reclassification of the sand particles. After the backwash, which is usually with unfiltered water, it is customary to run the first filtrate to waste before putting the filter back into service in order to prevent contamination of filtered water in the service lines with the unfiltered water left in the filter by the backwash.

Thus, standard filter practice involves the three operations of filtering to service, backwashing and filtering to waste; control of these operations in a single filtering unit being by ordinary conduit and valve means. Single multiway valves for controlling the various flows are common. However, as units are built of large and increasing size, difficulties with the multiway valves are encountered. Large valves may either leak or stick. They are difficult to operate. And when several filtering units are combined in a battery of filters designed for large scale work, coordinated control of numerous large valves presents many problems.

One of the main advantages in a battery of filters over a single large unit is in backwashing. Successful backwashing requires a high rate of flow, usually at least three to four times the normal filtering rate. In building single filters of large and increasing size, provision of supply and discharge lines with multiway valves and sometimes pumps and other accessories to handle a backwashing flow three or four times the filtering flow becomes impracticable. By dividing the single large unit, so to speak, into a battery of smaller units, the difficulty is eliminated. But the problem in automatic control of the reconditioning stages, backwashing, filtering to waste and return to service is multiplied.

It is an object achieved in the present invention to facilitate coordinated control of a plurality of filtering units combined in a battery. Another achieved object is to make the coordinated control automatic.

In achieving these objects, I have found that the practical disadvantages of large multiway valves in filter control are obviated and their advantages retained by replacing a plurality of multiway valves each controlling one filter of a battery of filtering units with individual valves for the several units and master valves controlling all units; each of the valves being provided with hydraulic operating means such as a cylinder and piston or diaphragm under control of a central rotary multiway pilot valve common to all valves of the battery—both the individual and the master valves.

The common rotary multiway pilot valve makes connections for all of the hydraulic valves with a common fluid pressure line through a plurality of casing ports in the pilot valve having connecting lines running to the several valves and through a rotatable pilot valve member adapted by openings and passages formed therein to connect the pressure line running to the valve with the various casing ports as the member is rotated. For cylinders and pistons serving as the hydraulic valve operating means, a common waste line running to the pilot valve is provided together with a plurality of paired casing ports in the valve affording connection for each valve operating cylinder with the waste line in addition to the pressure line connection; the arrangement being such that the pilot valve serves during its rotation as energizing means for both opening and closing the filter valves in predetermined order.

When hydraulic diaphragm valves are used instead of hydraulic piston valves fewer casing ports are required in the pilot valve. Either the opening or the closing of the diaphragm valves may be by spring action with the pilot valve energizing the closing or opening, as the case may be. It is usually more convenient to utilize piston valves with relatively large pipe sizes and diaphragm valves with relatively small pipe sizes.

In any case, complete coordination and control of reconditioning is effected by rotation of the pilot valve. A master valve controls the flow of raw water to the battery. A second master valve controls the service line running from the battery. A third and a fourth master valve control the inlet and outlet of backwash water to and from the battery, and a fifth master valve controls the outlet for filtering to waste. A single valve for each individual unit controls the backwashing of the unit. In the usual downflow filtering the individual valves of the battery units are conveniently placed in the top inlet lines, but they may be placed in the bottom lines serving as outlets for filtered water and as inlets for backwash water. In the filtering position of the pilot valve the raw water master valve and the service outlet master valve are held open and the various individual unit valves are also held open while the two backwash master valves and the master filtering to waste valve are held closed. For backwashing the pilot valve has a plurality of positions equal in number to the number of units in the battery. In all of the backwashing positions the backwash inlet and outlet master valves are open while the raw water master valve for the battery and the master service valve are closed, as is also the filter-to-waste master valve. In each of the several backwash positions one of the individual unit valves is opened by the pilot valve while the remaining individual unit valves are closed. This permits the individual units to be backwashed in turn. After all of the units have been backwashed a turn of the pilot valve to the filtering to waste position opens the master raw water valve and the filtering to waste master valve, also opens all of the individual unit valves, closes the two backwash master valves and leaves the master service valve closed. This effects filtering to waste through all of the battery units simultaneously. A further turn of the pilot valve closes the filter-to-waste master valve and opens the service master valve, thus returning the battery to the filtering position first described.

Modification of the valve arrangement just described makes it possible to backwash with filtered water. In this modification a master valve for the raw water is not required. Nor are the master backwash inlet and outlet valves required. A master valve on the service line is needed, as is a master filter-to-waste valve, unless the filtering to waste step is obviated, as is often possible. Each individual unit has two valve controlled lines connected to the top of the unit. Each of these two top lines has an individual valve, one controlling the raw water inlet and the other the backwash outlet. Backwash outlet lines run from the backwash outlet valves of the several units to a common backwash outlet line. The common outlet line for filtered water from the several units serves to direct filtered water into the bottom of each unit in turn as the raw water valve for this unit is closed by the pilot valve and the backwash unit valve is opened. Thus each unit is backwashed in turn by filtered water from the other units. The pilot valve controls the closing of the master service valve and the successive opening of the several unit backwash valves with closing of the corresponding raw water inlet valves. After all of the units have been backwashed a filtering to waste operation requires the filter-to-waste master valve to be opened while the master service valve is closed.

The pilot valve operation of a filter battery as described lends itself readily to automatic operation and control by electrical means. For this an electric motor is provided for rotating the pilot valve rotor. The electrical control means comprises rotary timing motor and adjustable switch means for starting the valve motor each time the pilot valve rotor remains in any one of its positions for a predetermined interval of time, with a circuit breaker connected in the switch circuit and operatively connected with the pilot valve rotor so as to stop the electric motor upon rotation of the pilot valve by the motor to any of its operative positions.

In the valve control by electrical means it is sometimes advantageous to provide a rotary multiway master valve for the battery with a rotary valve operating motor and to provide as individual valves for the several units a plurality of hydraulic valves controlled by individual solenoid pilot valves, the master valve motor and the solenoid pilot valves being all controlled and timed by the electrical control means so as to coordinate the operation of the individual valves with that of the rotary master valve.

In the accompanying drawings are shown, more or less diagrammatically, various embodiments of the invention. In this showing, Fig. 1 is a diagrammatic view in elevation of a battery of filters controlled by a single rotary multiway pilot valve for backwashing with unfiltered water;

Fig. 2 is a cross section of the pilot valve in filtering position, the section being on the line 2—2 of Fig. 4;

Fig. 3 is a section of the pilot valve showing the pressure fluid connection, being on the line 3—3 of Fig. 8;

Fig. 4 is a section on the line 4—4 of Fig. 2, showing the pilot valve port and rotor arrangement in filtering position;

Figs. 5, 6, 7 and 8 are sections similar to Fig. 4 and showing the pilot valve port and rotor arrangement in the several backwashing positions;

Fig. 9 is a section, also similar to Fig. 4, showing the pilot valve port and rotor arrangement in the filtering to waste position;

Fig. 17 is a diagrammatic view of automatic electrically controlled means for operating the pilot valve of the filter battery of Fig. 10;

Fig. 18 is a diagrammatic view in elevation of a modified system of filter battery control;

Fig. 19 is a detail in section of the individual hydraulic valves of Fig. 18 showing the construction of the individual solenoid pilot valves;

Fig. 20 is a section through the rotary multiway master valve of Fig. 18;

Figs. 21, 22 and 23 are sections along the line $x$—$x$ of Fig. 20 showing the port and rotor arrangement of the multiway master valve in the filtering, backwashing and filter-to-waste positions, respectively; and Fig. 24 shows in diagrammatic form the electrical system for automatic operation and control of the filter battery of Fig. 18.

Figure 1:
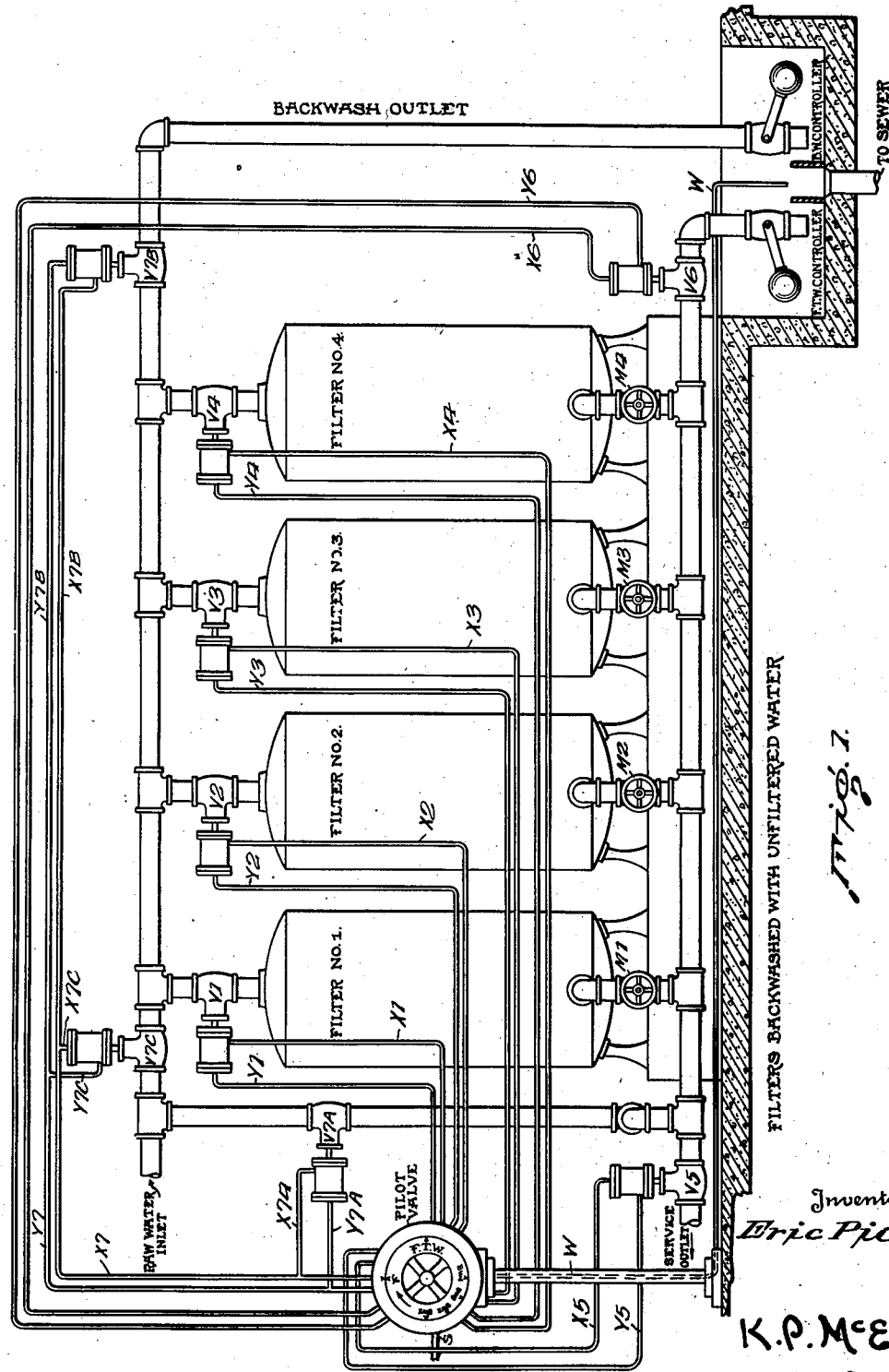

Referring now to Fig. 1, the battery consists, as shown, of four filter units Nos. 1, 2, 3 and 4 with individual valves V1, V2, V3 and V4 and with five master valves V5, V6 and V7a, V7b and V7c. Master valves V5 and V6 control the flow of filtered water from the battery as a whole to service and to waste, respectively. Master valves V7a, V7b and V7c control the flow of raw water to and from the battery for backwashing purposes, valve V7a being the backwash inlet master valve, valve V7b the backwash outlet master valve and V7c serving to control the flow of raw water to the battery for filtering and to cut off this filtering flow during the backwash.

All of the valves, both the five master valves and the four individual valves are, as shown, hydraulically operated by means of cylinders and pistons with connections to a central rotary multiway pilot valve controlling admission of pressure fluid from a common pressure line S to all of the hydraulic valve cylinders and also controlling discharge of pressure fluid from the valve cylinders into a common waste line W and thus serving to actuate all of the hydraulic valves both for opening and closing.

Manual valves M1, M2, M3, M4, may be provided in the several unit filters for convenience in shutting off an individual filter from the battery.

As shown in Fig. 2, the pilot valve is constructed with a stationary port plate and a rotor having a facing of hard rubber or material of a similar structure. The stator port plate is formed with a central waste port W having a pipe connection to the waste line or a drain and with seven pairs of ports, marked X and Y, having suitable pipe connections such as copper tubing running to the hydraulic cylinders of the V valves, with numbers corresponding to those of the various V valves, as shown in Fig. 1. The X lines for master valves V5, V6, V7c connect the corresponding X ports of the pilot valve to the top ends of the hydraulic valve cylinders, while the Y-port connections are to the bottom of the valve cylinders. The backwash inlet and outlet master valves V7a and V7b have their X-port connections to the bottom ends of the valve cylinders with the Y-port connections running to the top cylinder ends. All of the individual unit valves V1, V2, V3 and V4 have the bottom cylinder ends connected to X ports and the top cylinder ends to Y ports in the pilot valve.

The pilot valve has a pressure line connection S entering the valve casing at the side as shown in Fig. 3. The pilot valve rotor is formed with a series of openings O1, O2, O3 and O4, running through the rotor and communicating with the pressure chamber in the valve casing into which the pressure line S is connected. The rotor is formed also with two recesses R1 and R2 also in communication with the pressure chamber in the valve casing. In the rotor there is also formed a cavity or chambered passage C of such shape as to make connection as the rotor is rotated between all of the X and Y ports and the waste port in various positions of the valve rotor.

As shown in Figs. 4 to 9, the ports X1, X2, X3 and X4 which are connected to the individual unit valves V1, V2, V3 and V4 so as to open the valves when connection is made through these ports with the pressure line, are arranged on an outer circle in the port plate; the recess R1 being so placed in the valve rotor that in two positions of the valve (the filtering and filtering to waste positions) all of these ports receive pressure and the individual unit valves are all open, the rotor cavity C being so formed as to connect in these two positions the corresponding Y-ports Y1, Y2, Y3, Y4, with the waste port in the port plate. The arrangement of the X and Y ports will be understood from the following description of the control of the operations of the battery by means of the pilot valve.

With the pilot valve in the filtering position of Fig. 4, port Y5 of the master service valve V5 is connected to the pressure line through the rotor opening O2 and port X5 is connected to the waste line through rotor cavity C. Thus the master service valve is kept open. In this position of the pilot valve pressure is admitted to port X6 through rotor opening O1 and to port Y7 through rotor opening O2 while ports Y6 and X7 are connected to waste through rotor cavity C; valve V6, the filter-to-waste master valve, being closed, and backwash inlet and outlet master valves V7a and V7b being also closed, while master valve V7c is open because of the connection of branch Y7c to the bottom end of this valve cylinder. As a result of these valve settings by the pilot valve in the filtering position, raw water flows through all the filter units of the battery and to service, the unit valves V1, V2, V3, V4 being held open by connection of their X-ports in the pilot valve to pressure and of the corresponding Y-ports to the waste line.

When the filter battery requires backwashing, this is accomplished by closing the master service valve V5, opening the master backwash inlet and outlet valves V7a and V7b and closing master valve V7c, thus shutting off the flow of raw water to the tops of the filters and directing it to the bottom connection; at the same time, opening or leaving open one of the individual filter valves and closing the others. In the arrangement as shown in Figs. 1, 5, 6, 7, 8, rotation of the pilot valve to four successive backwash positions in turn connects ports X1, X2, X3 and X4 to the pressure line through recess R2 and thus effects in succession the opening of valves V1, V2, V3 and V4, each of the corresponding Y-ports being in turn connected to waste through rotor cavity C as the rotor is turned successively to the four backwashing positions, and the other Y-ports being simultaneously connected to pressure through rotor opening O4 or opening O3, as the case may be. The positions of the ports and the configurations of the rotor openings make these connections possible. In all of the four backwashing positions (Figs. 5, 6, 7, 8) ports X6, X7 and X5 are connected to pressure by opening O1 and ports Y6, Y7 and Y5 to waste by cavity C; thus holding the master service valve V5 and master filter-to-waste valve V6 closed and keeping the master backwashing valves V7a and V7b open and master valve V7c closed during the several separate and successive backwashings of units 1, 2, 3 and 4. It may be noted that the rotation of the pilot valve rotor from the filtering position to the No. 1 backwashing position is through an angle of approximately 90°, and that the several backwashing positions are approximately 30° apart with the several paired X and Y ports for units 1, 2, 3 and 4 in a corresponding angular spacing of 30°.

After the several filters in succession have been backwashed the battery valves are set for filtering to waste by turning the pilot valve rotor through an angle of approximately 90° from the backwashing position for filter No. 4. In this filtering-to-waste position (Fig. 9) all four of the individual valves V1, V2, V3 and V4, are held open by connection of their X-ports in the pilot valve to pressure through recess R1, the service valve V5 is closed by the connection of port X5 to pressure through opening O1, the master backwashing valves V7a and V7b are closed by the connection of port Y7 to pressure through opening O2 and master valve V7c is open because of the connection of branch Y7c to the bottom end of its operating cylinder. In this filter-to-waste position the master valve V6 is opened by the connection to pressure of its port Y6 which is connected to the bottom end of the operating cylinder; the position of cavity C in the pilot valve rotor and its configuration being such as to connect ports Y1, Y2, Y3, Y4, Y5, X6 and X7 to the waste line, through port W.

A further turn of the pilot valve rotor through an approximate 90° angle from the filtering to waste position shown in Fig. 9 returns the valve to the filtering position shown in Fig. 4, thus closing valve V6 and opening valve V5 to return the filter battery to service, the individual valves V1, V2, V3 and V4 remaining open as well as master valve V7c.

In the battery arrangement of Fig. 1 backwashing is effected by a high rate of flow of unfiltered water through each filter of the battery in turn. The normal filtering flow through the battery is readily concentrated into one flow through each single unit, thus increasing the rate of flow for backwashing to four times the normal filtering rate. The rate of flow for backwashing is, however, subject to regulation by means of a backwash flow controller at the discharge end of the backwash outlet line. The arrangement indicated in Fig. 1 is described in Applebaum Patent No. 1,443,892. A similar rate of flow controller is arranged at the filter-to-waste outlet beyond valve V6 in order to prevent waste of water and to assure a suitable rate of flow through the battery in the filtering to waste operation.

Figure 10:
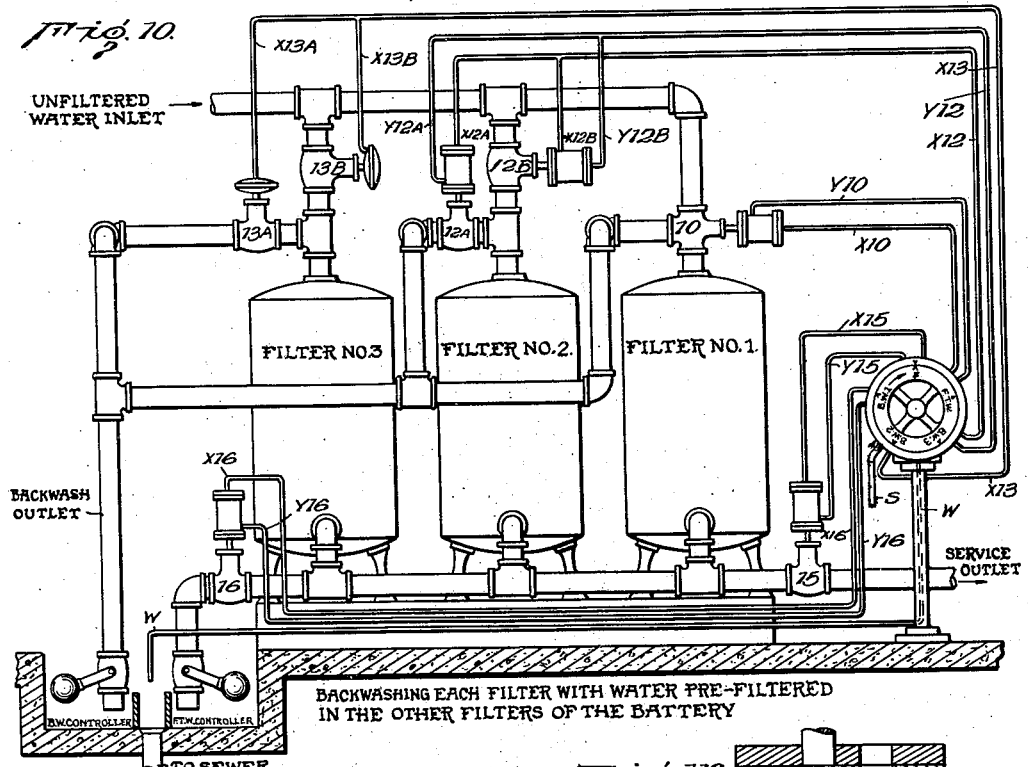
Fig. 10 shows a diagram in elevation of a filter battery controlled by a central rotary pilot valve for backwashing each of the several unit filters with water that is prefiltered in the other units of the battery.

In Fig. 10 is shown a modified arrangement of individual and master valves under control of the common rotary multiway pilot valve by which each filter unit is backwashed with filtered water flowing from the other units of the battery. While there is shown in this figure a battery of only three separate filters, it will be understood that the valve arrangement here shown for three filtering units will be substantially the same for any desired number of units. During backwashing of the several single units by filtered water from the other units, the rate of flow may be increased over the normal filtering flow by suitable adjustment of the backwash controller to provide a suitable flow for properly backwashing the several filters.

Figure 16:
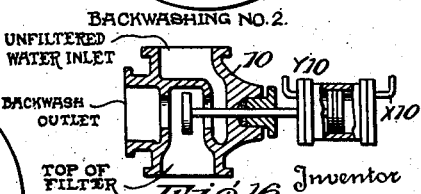
Fig. 16 is a section through the two-way hydraulically operated individual valve shown as valve 10 in Fig. 10.

In Fig. 10 three different types of individual filter valves are shown. Valve 10 on filter No. 1 is shown as a two-way valve adapted in one position to establish communication between the unfiltered water inlet line and the top of the filter and in the other position to establish communication between the top of the filter and the backwash outlet line. Fig. 16 shows the structure of this valve with an operating connection to a piston and cylinder with pipe connections X10 and Y10 at either end for admission and exhaust of pressure fluid. The arrangement is such that when pressure is applied at X10 raw water flows into the top of filter No. 1 and when pressure is applied at Y10, water leaves the filter and flows to the backwash outlet line.

Filter unit No. 2 is shown as controlled by two separate hydraulic valves 12B and 12A on a T fitting at the top of the filter, and connected in unison through the pilot valve with pressure and waste lines so that when valve 12B is opened to connect the filter with the unfiltered water inlet line, the other valve 12A is closed and when valve 12B is closed, then valve 12A is open to allow water to flow from the top of the filter into the backwash outlet line.

Similar results are obtained by the individual valve arrangement shown for filter No. 3 wherein two separate valves on the raw water inlet line and the backwash outlet line are spring diaphragm valves 13B and 13A; valve 13B being normally closed by its spring and opened when pressure is admitted to the diaphragm and valve 13A being normally open and closed when pressure is admitted to the diaphragm. The battery is shown in Fig. 10 as having only two master valves, valve 15 controlling flow from the battery to service and valve 16 controlling the common filter-to-waste outlet for the battery. The several backwash outlet valves for the individual units are shown connected into a common backwash outlet line. Both the backwash outlet line and the filter-to-waste outlet deliver into a waste receiver with automatic rate of flow control by float valves as described in the Applebaum Patent No. 1,443,892.

The pilot valve of Figs. 10 to 16 is similar to that of Figs. 1 to 9, but its structure is considerably simplified because of the smaller number of hydraulic valve connections required for operation of the battery and of the fact that the individual valves as shown for No. 3 filter are diaphragm valves requiring for both valves only a single connection to the pilot valve. Valves 12B and 12A for No. 2 filter are served by one pressure port connection and one waste port connection in the pilot valve and the two-way valve 10 for No. 1 filter takes the place of the two valves on each of the other units.

Figures 11, 11A:
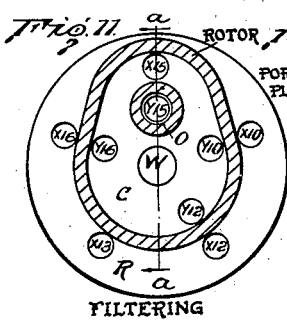
Figs. 11 and 11a, 12, 13, 14 and 15 are cross sections of the pilot valve of Fig. 10 showing the port and rotor arrangements in the respective positions for filtering, for backwashing the several units and for filtering to waste, Fig. 11a being a section through the rotor and port plate on line a—a of Fig. 11.
Figure 12:
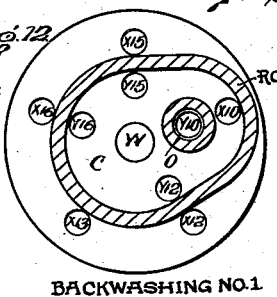
Figure 13:
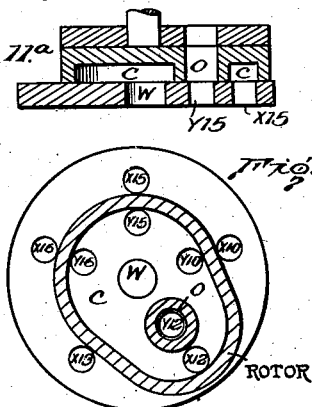
Figure 14:
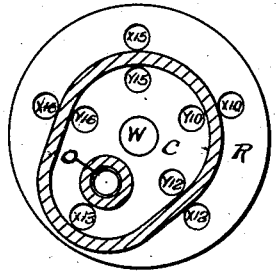
Figure 15:
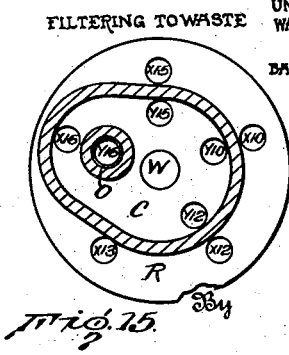

In the filtering position of the pilot valve, as shown in Figs. 11 and 11a, ports X10, X12, X13 and X16 are supplied with pressure through the rotor recess R while ports Y10, Y12 and Y16 are connected to waste port W through cavity C, so that the filter-to-waste outlet master valve 16 is closed, valve 10 connects No. 1 filter to the raw water line, valves 12B and 13B are open and valves 12A and 13A are closed. Port Y15 is supplied with pressure through the single opening O formed in the pilot valve rotor, with port X15 connected to waste through the rotor cavity C, thus opening the master service valve 15. In this position of the pilot valve unfiltered water flows into the tops of all the filters and filtered water flows from the bottoms and into the service line.

Upon turning the pilot valve rotor through 72 degrees to backwash position for No. 1 filter (Fig. 12), the port connections of valve 15 are reversed so that pressure is supplied through port X15 with port Y15 connected to waste and the master service valve 15 is closed. Likewise, the hydraulic connections for valve 10 are reversed so that the raw water inlet line on No. 1 filter is shut off and the backwash outlet line is opened. The valves on No. 2 and No. 3 filters are left in the same positions as in the filtering stage. Raw water is filtered in filters No. 2 and No. 3 and filtered water flows from the bottoms of these units up through No. 1 filter and out through the backwash outlet line. Thus No. 1 filter is backwashed with filtered water.

Upon turning the pilot valve rotor through a second angle of 72 degrees to the backwash position for No. 2 filter (Fig. 3), valve 10 on No. 1 filter is restored to its normal filtering position closing the backwash outlet and opening the raw water inlet. This is effected by the supply of pressure to port X10 through rotor recess R, with connection of port Y10 to waste through cavity C. At the same time valve 12A is opened and valve 12B is closed by the admission of pressure to port Y12 through rotor opening O with connection of port X12 to waste through cavity C. Valve 13B is left open and valve 13A is left closed by the connection of port X13 to pressure. Ports X15 and X16 receive pressure through the rotor recess and master valves 15 and 16 remain closed. Raw water is now filtered in No. 1 and No. 3 filters and the filtered water backwashes No. 2 filter.

Upon turning the pilot valve to No. 3 backwashing position (Fig. 14) which is approximately 72 degrees from the second backwash position, the hydraulic connections to valves 12B and 12A are reversed by the passing of rotor opening O from engagement with port Y12 with connection of port X12 to pressure through recess R and of port Y12 to waste through cavity C. At the same time the pressure on the diaphragms of valves 13B and 13A is released by connection of port X13 to waste through cavity C; valve 13A being opened by its spring and valve 13B closed by its spring. The setting of valve 10 is unchanged. Valves 15 and 16 remain closed. As a result, No. 3 filter is backwashed by filtered water from No. 1 and No. 2 filters.

In the filter-to-waste position of the pilot valve (Fig. 15) master valve 16 is opened by pressure admitted to port Y16 through rotor opening O, master valve 15 remains closed and diaphragm valves 13B and 13A are restored to their normal positions by the connection of port X13 to the pressure line through recess R. Valves 10, 12B and 12A remain in the filtering positions. All three units now filter to waste.

While a short period of filtering to waste as described is usually advantageous, this may be omitted in some cases and in that event valve 16 with the filter-to-waste line in connection with the bottoms of the filters can be omitted. Then ports X16 and Y16 in the pilot valve are not needed and the pilot valve may be returned directly to the normal filtering position from the last backwashing position.

Should diaphragm valves 13B and 13A be replaced by piston valves it is a simple matter to provide an additional port in the pilot valve port plate in a position relative to that of port X13 similar to the relative positions of ports Y10, Y12, Y15, Y16 and with an additional pipe connection and branches to the piston valves. Then in the No. 3 backwashing position of the pilot valve the positions of the individual piston valves are changed from filtering to backwashing by admission of pressure to the additional port Y13 through rotor opening O. Should piston valves 12B and 12A be replaced by spring diaphragm valves, the Y12 port connection to the pilot valve would be omitted and port Y12 could be plugged.

In Fig. 17 is shown a diagram of an automatic electrical control system adapted to the battery of Fig. 10. The pilot valve is driven by a valve motor through a gear reduction. A circuit-breaker comprises a brush 110 contacting a drum 111 mounted on an extension of the pilot valve shaft and carrying an arm 112 adapted to make contact with any one of the main contact strips 113, 114, 115, 116 and 117, and with the auxiliary contact strips 118, 119, 120 and 121.

To start backwashing of the filters a master timer 121A which is usually electrically driven, comprises a constant speed motor 122 and an arm 123 driven thereby, with suitable speed reduction and adapted to make contact with the adjustable contact point 124.

For controlling the duration of the backwash in each filter and of the filter-to-waste operation of the battery there are provided individual timers 125, 126, 127 and 128 which may be of identical construction. Each timer has a constant speed motor 129 driving by means of a gear reduction 130 an arm 131 made of insulating material and carrying two contact plates 132 and 133. Two stationary contact strips 134 and 135 are provided with gaps 136 and 137, respectively, and are adapted to be electrically connected by plate 133. Two short contact strips 138 and 139 are provided, adjustable as to their angular spacing in relation to the gaps 136 and 137. Contact plate 132 is adapted to establish electric connection between strips 138 and 139.

An electric power line includes wire 140 with branch 141 connected to the master timer motor 122, branches 142 connected to the contact strips 135 of the timers 125, 126, 127 and 128 and branch 143 connected to the circuit breaker brush 110. The other incoming power wire 144 has branch 145 connected to the valve motor, branch 146 connected to the other pole of the master timer motor 122 and branches 147 connected to one pole of motor 129 of each individual timer. A wire 148 connects contact strip 113 of the circuit breaker with the arm 123 of the master timer and the adjustable contact 124 is connected by wire 149 with the valve motor. Wire 150 connects auxiliary contact strip 118 of the circuit breaker with the other pole of motor 129 of backwash timer No. 1 and also with contact strip 134 of this timer. Similar connections 160, 170 and 180 are made from auxiliary contact strips 119, 120 and 121 to the other timers. Wires 151, 161, 171 and 181, respectively, connect circuit breaker contact strips 114, 115, 116 and 117 with contacts 138 of the several timers and wires 152 connect contacts 139 of the several timers with wire 149 leading to the valve motor.

Operation of the electrical control system is as follows: The adjustable contact 124 of master timer 121A is set so as to initiate the backwashing cycle at the desired time. Motor 122 being connected directly to the power line runs continuously. When arm 123 reaches contact 124, a circuit is established through wires 140 and 143, brush 110, drum 111, arm 112, strip 113, wire 148, arm 123, point 124, wire 149, the valve motor and wires 145 and 144. The valve motor starts and rotates the pilot valve rotor until arm 112 leaves strip 113, breaking the circuit, and comes to rest in contact with strips 114 and 118. The pilot valve is now set in its first backwashing position. A circuit is now established from the power line through wires 140 and 143, brush 110, drum 111, arm 112, auxiliary strip 118, wire 150, motor 129 of backwash timer No. 1 and wires 147 and 144. Motor 129 is started and rotates the arm 131 until, after a predetermined interval of time, plate 132 meets contact points 138 and 139. This establishes a circuit from wires 140 and 143 through brush 110, drum 111, arm 112, strip 114, wire 151, contact 138, plate 132, contact 139, wires 152 and 149, the valve motor and wires 145 and 144. The valve motor again runs and turns the pilot valve rotor to backwash position No. 2, where it comes to rest due to the breaking of the circuit when the arm 112 slides off strip 114 and comes to rest on strips 115 and 119. The fact that arm 112 leaves auxiliary strip 118 does not stop the motor 129 because in the meantime plate 133 has contacted strips 134 and 135 which establishes a circuit through wires 140 and 142, strip 135, plate 133, strip 134, part of wire 150, motor 129 and wires 147 and 144. Thus the motor 129 keeps on running until the arm 131 of the backwash timer is reset in its zero position where plate 133 is opposite gaps 136 and 137.

The timing of the other steps takes place in a similar manner and the duration of each step is independently adjustable in the angular position of contacts 138 and 139 in each timer. The contact of circuit breaker arm 112 with strip 119 starts the timing motor for backwash timer No. 2 and when the rotating plate 132 of this timer 126 connects its contact strips 138 and 139, the valve motor is again started and the pilot valve rotated to set the filter valves for backwashing No. 3 filter. When arm 112 leaves strip 119, the timing motor is energized through the strips 134 and 135 to reset the timer in zero position. Similarly, as arm 112 passes from strip 115 to strip 116 and auxiliary strip 120, the valve motor is stopped with the valves in No. 3 backwashing position and backwash timer No. 3 comes into action. This backwash timer 127 starts the valve motor at a predetermined time, depending upon the adjustment of the angular position of strips 138 and 139, and the valves are set by the rotation of the pilot valve for the filter-to-waste operation of the battery, the valve motor being stopped and the filter-to-waste timing motor being started when arm 112 passes from strip 116 to contact strips 117 and 121.

The duration of the filter-to-waste operation and thus the quantity of the water filtered to waste are determined by the angular position of strips 138 and 139 in the filter-to-waste timer 128. By placing these strips a small angular distance from the zero position of arm 131, a short filtering to waste is obtained; this being all that is required usually when the filters are backwashed with filtered water. When these strips 138 and 139 are connected by plate 132 the valve motor circuit is closed through circuit breaker strip 117 to start the valve motor rotating the pilot valve to the normal filtering position where it is set as the arm 112 passes from strip 117 to strip 113.

In the meantime, arm 123 of the master timer 121A has passed by the adjustable contact 124. All circuits are now open except that of the master timing motor 122 through the branch wires 141, 146. The control system is thus ready to repeat the reconditioning cycle of the filter battery when arm 123 again reaches contact 124.

The same control system may of course be used for the filter battery of Fig. 1 by merely adding a backwash timer for filter No. 4 and the corresponding main and auxiliary contact strips in the circuit-breaker. The length of the circuit-breaker strips would have to be adapted to the unequal angles between the positions of the pilot valve of Figs. 2 to 9.

In a modified battery control system, shown in Figs. 18 to 24, inclusive, the master valves for the battery are replaced by a single rotary multiway master valve controlling the several inlet and outlet flows of water to the battery as a whole and the individual filter valves are hydraulically operated valves with individual pilot valves electrically controlled as by individual solenoids. Coordinated operation of the master valve and the individual valves is obtained by means of an electric motor operating the master valve with a circuit breaker operatively connected to the stem or shaft of the master valve and with additional timing motor and switch means adapted to control both the master valve motor and the individual solenoid valves to determine the duration of the several unit backwashings and of the filtering to waste operation.

The motor operated multiway master valve (Figs. 20 to 23) comprises a valve casing with connections to the raw or unfiltered water line, to the service outlet, to the backwash and filter-to-waste outlets and to the two lines connected with the tops and with the bottoms of the filter units. Within the valve casing is a stationary port plate 31 having ports formed therein and connected, respectively, to the top and bottom lines of the filter battery, to the service outlet line and to the backwashing and filter-to-waste outlet lines. Engaging the port plate is the slide or rotor member 32, advantageously faced with hard rubber, and surrounding the rotor is a chamber 33 into which the raw water line is connected. The slide rotor is formed with a discoid portion 34 having an opening 35 therethrough and an arcuate chambered portion 36. The rotor is held upon the port plate by a spring and closure member having a bore and stuffing gland through which the operating stem or shaft 37 of the rotor extends, as shown, to an enclosed gear reduction train operatively connecting the master valve rotor to the operating motor. The circuit breaker switch is arranged upon the end of the valve shaft 37.

In the filtering position (Fig. 21) of the master valve raw water flows from the chamber 33 through the rotor opening 35 and the top line port of the port plate to the top line of the filter battery and filtered water flows back through the bottom line of the battery to the bottom port of the master valve from which connection is made to the service outlet port through rotor chamber 36.

In the backwashing position of the master valve (Fig. 22) connection is made from chamber 33 by rotor opening 35 to the bottom port of the valve and rotor chamber 36 connects the top port with the port connected to the backwash waste outlet. Raw water flows from the inlet line to the bottom of the battery and backwash water flows from the top of the battery to waste.

In the filter-to-waste position of the master valve (Fig. 23) rotor opening 35 connects chamber 33 with the top port and rotor chamber 36 connects the bottom port to the filter-to-waste outlet port. Connection is thus made for raw water to run to the top of the battery and for filtered water to run from the bottom of the battery to waste.

For the several filter units 1, 2 and 3, individual valves E1, E2 and E3 are provided in the form of hydraulically operated valves either of the piston-cylinder type or spring diaphragm valves and controlled by individual pilot valves P1, P2 and P3, the pilot valves being operated, as shown, by solenoids S1, S2 and S3, respectively.

A convenient structure for the solenoid pilot valves is shown in Fig. 19. The pilot valve P is connected to a suitable source of fluid pressure through the opening G and to a waste line through opening R. In the valve casing a passage U connects the opening R to opposite ends of a central valve cylinder in which is a valve member V in the form of a double piston operated by a solenoid armature SM and spring. From the central valve cylinder connections B and T run to either end of the piston cylinder of a hydraulic valve. When the hydraulic valve is of the diaphragm type, either one of these connections can be plugged off so as to provide the desired opening or closing of the diaphragm valve by pressure. In the valve as shown, when the solenoid is de-energized pressure is admitted to the B connection from the opening G to open the hydraulic valve and waste fluid is discharged through the T connection and the upper branch of valve passage U to the waste line connected at R. When the solenoid is energized pressure goes to the T connection to close the hydraulic valve, waste fluid being discharged through the B connection and the lower branch of passage U.

Valves E1, E2, and E3 are so arranged as to be all opened by their solenoid pilot valves to operate the battery in the filtering stage and in the final filtering-to-waste stage. Backwashing of each filter in turn is effected by closing two of the three individual valves and opening the one on the unit to be backwashed. Water then flows from the unfiltered water inlet line through the master valve upwardly through each unit in turn and out through the top line to the master valve and thence to the backwash outlet.

In the electrical control system as shown in Fig. 24, the motor operating the master valve is of the three-phase alternating current type and started and stopped by a magnetic switch closed by an electromagnet K which is energized by a separate motor control circuit.

The circuit breaker which operates both to make and to break the control circuit comprises a brush 210 contacting a drum 211 mounted on an extension of the master valve shaft 37 and carrying an arm 212 adapted to make contact with any of three main contact strips 213, 214 and 215 of arcuate lengths corresponding to the angular positions of the master valve rotor in the filtering, backwashing and filter-to-waste stages. Arm 212 is also adapted to make contact with three auxiliary contact strips 216, 217 and 218.

To initiate backwashing in an automatic manner there is provided advantageously, as shown, a master timer. But other known means could be used, such for example as a switch operated by a water meter in the supply or service line or by a differential pressure gauge responsive to the increase in the pressure drop through the filters resulting from the filtering operation. The master timer comprises a constant speed motor 219 driving, through a speed reducer 220 an arm 221 made of insulating material and carrying a metal plate 222 adapted to make connection between a ring contact 223 and an adjustable contact point 224. The arrangement is such that plate 222 is in contact with point 224 for a period of time shorter than that required for the backwashing and filtering to waste operations of the battery.

The duration of backwashing each filter is controlled by individual adjustable backwash timers No. 1, No. 2, and No. 3 of identical construction. Each has a motor 225 driving, through a speed reducer 226 an arm 227 made of insulating material and carrying metallic contact plates 228, 229 and 230. Plate 228 is adapted to establish electric connection between a strip 231 (having a gap or current interrupting portion 232) and a ring contact 233; plate 229 is adapted to make connection between a ring contact 234 and either a fixed contact strip 235 extending through approximately three quarters of a circle, as shown, or an angularly movable contact strip 236 which is electrically connected to strip 235; plate 230 is adapted to make connection between a movable contact point 237 and a fixed contact strip 238. Strip 236 and point 237 are preferably always adjusted to their relative position as shown, and, to this end, may be connected by a member made of insulating material. The duration of backwashing is lengthened or shortened by lengthening or shortening the gap between the ends of strips 235 and 236, and the arrangement is such that the time required for arm 227 to make one complete revolution is longer than the maximum total time required for backwashing all the filters of the battery.

The duration of the filtering-to-waste operation is controlled by a separate adjustable timer comprising a motor 239 driving, through a speed reducer 240, an arm 241 made of insulating material and carrying plates 242 and 243. Plate 243 is adapted to establish electric connection between a strip 244 (having a gap 245) and a ring contact 246; plate 242 is adapted to establish connection between a ring contact 247 and an angularly adjustable contact point 248.

The arms 221, 227 and 241 of the timers are all arranged to rotate in a clockwise direction upon energization of the respective timer motors.

The electric power for the control circuits is supplied through wires 250 and 259. Wire 250 has branch 251 connected to brush 210, branch 252 connected to the master timer motor 219, branch 253 connected to ring contact 233 of backwash timer No. 1, branch 254 connected to point 237 of the same timer, branch 255 connected to ring contact 233 of backwash timer No. 2, branch 256 connected to point 237 of the same timer, branch 257 connected to ring contact 233 of backwash timer No. 3, and branch 258 connected to strip 246 of the filter-to-waste timer. Wire 259 has branch 260 connected to motor 219, branches 261 and 262 connected to motor 225 and contact 234, respectively, of backwash timer No. 1, branches 263 and 264 connected to motor 225 and contact 234, respectively, of backwash timer No. 2; branches 265 and 266 connected to motor 225 and contact 234, respectively, of backwash timer No. 3, branch 267 connected to motor 239 of the filter to waste timer and branch 268 connected to the magnet K of the motor starting switch.

Wire 269 connects strip 213 of the circuit breaker and ring contact 223 of the master timer. Wire 270 connects contact point 224 of the master timer with the magnet K and has branch 271 leading to strip 238 of backwash timer No. 3, and branch 272 leading to contact point 248 of the filter to waste timer. Wire 273 connects auxiliary strip 216 of the circuit breaker with motor 225 of backwash timer No. 1 and has an extension 274 to strip 231. Wire 275 connected to auxiliary strip 217 of the circuit breaker has branches 276, 277 and 278 leading to the solenoids S1, S2 and S3, respectively, of the solenoid pilot valves P1, P2 and P3. Wires 279, 280 and 281 connect the solenoids S1, S2 and S3 with contact strips 235 of the backwash timers Nos. 1, 2 and 3, respectively.

Wire 282 with extension 282A leads from strip 238 of backwash timer No. 1 to motor 225 and strip 231 of backwash timer No. 2. Wire 283 with extension 283A leads from strip 238 of backwash timer No. 2 to motor 225 and strip 231 of backwash timer No. 3.

Wire 284 leads from circuit breaker strip 214 to point 237 of backwash timer No. 3. Wire 285 leads from auxiliary strip 218 to timing motor 239 and has an extension 286 to strip 244. Wire 287 connects strip 215 with ring contact 247.

In operation, the master timing motor 219 runs continuously and causes reconditioning of the battery to take place at predetermined times by moving plate 222 onto point 224. This establishes a circuit through wires 250, 251, brush 210, drum 211, arm 212, strip 213, wire 269, contact 223, plate 222, point 224, wire 270, magnet K and wires 268 and 259. The motor starting switch closes, and the valve motor, through the gear reduction, turns the rotor of the multiport master valve until, in the backwash position, the circuit through magnet K is interrupted by arm 212 moving from strip 213 onto strip 214, and the valve motor is switched off.

In the backwash position of the master valve, arm 212 contacts strip 216 and establishes a first circuit through timing motor 225 of backwash timer No. 1 from wires 250 and 251 through brush 210, drum 211, arm 212, strip 216, wire 273 and motor 225 to wires 261 and 259. Motor 225 starts, and shortly moves plate 228 onto strip 231, thereby establishing a second circuit through the timing motor 225, this second circuit comprising wires 250 and 253, contact 233, plate 228, strip 231, wire 274, motor 225, and wires 261 and 259. Even though the first circuit through the motor 225 will be interrupted when arm 212 moves from strip 216, the second circuit maintains motor 225 in operation until arm 227 has returned to its starting or zero position and the second circuit is interrupted by plate 228 leaving strip 231 and coming to rest on gap 232.

In the backwash position arm 212 on the master valve shaft also contacts strip 217, thereby establishing a circuit from wires 250 and 251 through brush 210, drum 211, arm 212, strip 217 and wire 275, then branching into three branches, the first branch going through wire 276, solenoid S1, wire 279, then strip 235, plate 229 and contact 234 of backwash timer No. 1, and wires 262 and 259, the second branch going through wire 277, solenoid S2, wire 280, the strip 235, plate 229 and contact 234 of backwash timer No. 2, and wires 264 and 259, and the third branch going through wire 278, solenoid S3, wire 281, then strip 235, plate 229, and contact 234 of backwash timer No. 3, and wires 266 and 259. The solenoids S1, S2 and S3 are energized, and the pilot valves P1, P2 and P3 are moved to the position in which they cause valves E1, E2 and E3 to close; there is no flow through any of the three filters.

After a brief interval of time arm 227 of backwash timer No. 1 moves plate 229 from the end of strip 235, thereby interrupting the circuit through the first branch. Solenoid S1 is de-energized and solenoid valve P1 is moved by its spring to open valve E1 so that filter No. 1 is backwashed until plate 229 moves onto strip 236, re-establishing the first branch circuit and causing valve E1 to close. At about that time plate 230 of backwash timer No. 1 reaches point 237 which starts motor 225 of backwash timer No. 2 by means of a first circuit going from wires 250 and 254, through point 237, plate 230 and strip 238 of backwash timer No. 1, wire 282, motor 225 of backwash timer No. 2, and wires 263 and 259. Arm 227 of backwash timer No. 2 moves and soon establishes a second circuit through wires 250 and 255, then contact 233, plate 228 and strip 231 of backwash timer No. 2, wire 282A, motor 225 and wires 263 and 259. This second circuit is maintained until it is interrupted when plate 228 of backwash timer No. 2 moves from strip 231 onto gap 232 with arm 227 left in its zero position (the first circuit having been interrupted earlier when plate 230 of backwash timer No. 1 leaves point 237).

While plate 229 of backwash timer No. 2 moves through the gap between strips 235 and 236 the solenoid S2 is de-energized, valve E2 is opened and filter No. 2 is backwashed.

Then plate 230 of backwash timer No. 2 moving onto point 237 starts the motor 225 of backwash timer No. 3, and backwashing of filter No. 3 ensues under similar control as that of filters Nos. 1 and 2.

When, at the end of the backwash period of filter No. 3, plate 230 of backwash timer No. 3 contacts point 237 a circuit is established from wires 250 and 251 through brush 210, drum 211, arm 212, strip 214, wire 284, then point 237, plate 230 and strip 238 of backwash timer No. 3, wires 271 and 270, magnet K, and wires 268 and 259.

The master valve motor again operates and shortly the circuit breaker interrupts the current through the solenoids S1, S2 and S3 when arm 212 leaves strip 217. As a result the three solenoids are de-energized and valves E1, E2 and E3 open.

When the multiport master valve reaches the filter-to-waste position arm 212 moves from strip 214 (interrupting the circuit through magnet K and de-energizing the valve motor) and comes to rest on strips 215 and 218.

All filters of the battery now filter to waste, and the motor 239 of the filter-to-waste timer is set in motion by a first circuit from wires 250 and 251 through brush 210, drum 211, arm 212, strip 218, wire 285, motor 239, and wires 267 and 259. After a brief interval of time plate 243 moved on arm 241 establishes a second circuit from wires 250 and 258 through contact 246, plate 243, strip 244, wire 286, motor 239, and wires 267 and 259. This second circuit is maintained until arm 241 has returned to its zero position with plate 243 over gap 245 in strip 244.

Filtering to waste continues until plate 242 reaches point 248. Thereupon the master valve motor is energized a third time by a circuit through wires 250 and 251, brush 210, drum 211, arm 212, strip 215, wire 287, contact 247, plate 242, point 248, wires 272 and 270, magnet K, and wires 268 and 259. This current is interrupted when arm 212 leaves strip 215 (moving onto strip 213) and the valve motor is de-energized, leaving the multiport master valve in the filtering position. The motors 225 of the backwash timers and motor 239 of the filter-to-waste timer continue to run until the arms of all the timers have been reset in their respective zero positions. Thereupon all electric circuits are dead, with the exception of the master timer circuit through wires 250, 252, motor 219, and wires 260, 259, and the apparatus is in readiness to repeat its reconditioning cycle as soon as plate 222 of the master timer again reaches contact point 224.

It may be noted that in the filter battery systems as described, the filtering operation of the battery is interrupted for reconditioning the battery. It is usually convenient to arrange for this reconditioning at times when filtered water is not required or to provide storage for a reserve supply of filtered water to be available during the reconditioning of the battery. The advantages of coordinated battery control outweigh any inconvenience there may be in the interruption of filtering.

What I claim is:

1. A water filter battery system under coordinated automatic operation and control comprising a plurality of filtering units arranged in a battery, master valve means controlling flow through the battery as a whole, a plurality of other valve means respectively controlling flows through the individual units of the battery, power means actuating the master and individual valve means and electrical timing control means for said power means comprising a control circuit, rotary circuit making and breaking means operated by said power means and a plurality of both master and individual rotary electric timing motors with rotary switch means connected in electrical series with said circuit making and breaking means and controlling the power means to set both the master valve means and the individual valve means for a period of time determined by one of the master timing motors in a first or filtering position passing water downwardly through all filters of the battery to service, then for several intervals of time respectively determined by the several individual timing motors in a plurality of successive backwashing positions passing water upwardly through one filter at a time to waste and cutting off flow to service and finally for an interval of time determined by another timing motor in a filter-to-waste position passing water downwardly through all filters of the battery to waste and cutting off flow to service, said last named timing motor operating switch means energizing said power means to return the valve means to the first or filtering position.

2. A water filter battery system under coordinated automatic operation and control comprising a plurality of filtering units arranged in a battery, master valve means controlling flow through the battery as a whole, a plurality of other valve means respectively controlling flows through the individual units of the battery, power means actuating the master and the individual valve means first to pass water downwardly through all filters of the battery to service, then to cut off the service flow and to pass water upwardly through each filter in turn for backwashing and finally to pass water downwardly through all filters to waste and electrical timing control means for said power means comprising a control circuit, circuit making and breaking means operated by said power means and a plurality of rotary electric motors and switch timer means connected in the control circuit and in electrical series with said circuit making and breaking means so as to time the respective backwashing of each filter and the common filtering to waste of all filters, the several backwash timers being connected to energize the power means actuating the valve means so as to control the respective durations of the individual filter backwashings and to start each succeeding backwash and the filtering-to-waste valve operation and the filter-to-waste timer being connected to control the duration of filtering to waste and return of the battery to the filtering to service operation.

3. A water filtering system comprising a plurality of filter units arranged in parallel in a battery with a raw water line, a service line and waste lines, a plurality of master valves controlling flow through all the units of the battery as a whole, a plurality of individual valves each controlling flow through one unit of the battery, hydraulic operating means for each of said master and individual valves, a fluid pressure line, a common rotary multiway pilot valve for energizing each of said hydraulic means by connection to said pressure line, said pilot valve having a connection with the pressure line and a plurality of ports connected by pipes to each of said hydraulic valves and a rotatable valve member with passages formed therein for connecting the valve ports to said pressure connection, the arrangement of said ports and passages being such that by rotating said pilot valve member to various angular positions in a complete circle the hydraulic valves are set in a first or filtering position of the pilot valve to pass water downwardly through all filters of the battery to service then in a plurality of backwashing positions of the pilot valve the hydraulic valves are set to shut off flow to service and to pass water upwardly through each of the several filters of the battery in succession to waste and in a final or filter-to-waste position of the pilot valve the hydraulic valves are set to pass water downwardly through all filters of the battery to waste while shutting off flow to service, and means for rotating said pilot valve rotor to said angular positions.

4. A filtering system according to claim 3 wherein the hydraulic valves are set in the several backwashing positions of the pilot valve to pass unfiltered water from the raw water line upwardly through each of the several filter units in turn for backwashing and to waste and to shut off flow through the other filter units.

5. A water filtering system comprising a plurality of filter units arranged in parallel in a battery with a raw water inlet line, a service outlet line and a common backwash outlet line, conduit connections at the top of each filter from the raw water line and to the backwash outlet line, master valves controlling flow through all the battery units, individual valves in said two conduit connections for each filter, hydraulic operating means for each of said master and individual valves, a fluid pressure line, a common rotary multiway pilot valve for energizing each of said hydraulic means by connection to said pressure line, said pilot valve having a connection with the pressure line and a plurality of ports with respective pipe connections to said hydraulic valves and a rotatable valve member with passages formed therein for connecting the valve ports to said pressure connection, the arrangement of said ports and passages being such that by rotating said pilot valve rotor to various angular positions the master and individual valves are set in a first or filtering position of the pilot valve to pass water downwardly through all units of the battery and to service and in a plurality of other or backwashing positions of the pilot valve the master and individual valves are set to pass filtered water upwardly through each unit in succession from the other filter units and to the backwash outlet line and to shut off the service line, and means for rotating said pilot valve rotor to said angular positions.

6. An automatically operated and controlled water filtering system which comprises, in combination, a plurality of filter units arranged in a battery with master valves controlling the battery and a plurality of individual valves for the several units, hydraulic operating means for each of said master and individual valves, a common rotary multiway pilot valve adapted in a plurality of successive angular positions to energize each of said hydraulic means by connection to a common fluid pressure line so as to actuate the master and individual valves for backwashing each of said filter units separately and in succession, an electric motor for rotating the pilot valve rotor, an electrical control circuit for said motor, circuit making and breaking means connected in the control circuit and operatively connected with the pilot valve rotor, and rotary timing motor and switch means also connected in said circuit and acting to close said circuit and start the pilot valve motor each time the pilot valve remains in one of said angular positions for a predetermined length of time, said circuit making and breaking means acting to open said circuit and stop the pilot valve motor upon rotation of the pilot valve to each of said angular positions.

7. In a battery of a plurality of filters, coordinated means for operation and control comprising a plurality of master valves controlling flow through the battery and a plurality of individual valves each controlling flow through a single filter, a pressure cylinder and piston operating each of said master and individual valves, a fluid pressure line and a waste line, a common rotary multiway pilot valve for energizing said pistons by introduction of pressure fluid from said pressure line to said cylinders with discharge of waste fluid therefrom to said waste line, said pilot valve having a pressure chamber connected to the pressure line, a waste port connected to the waste line, a plurality of pairs of ports connected to opposite ends of said pressure cylinders and a rotatable valve member with a plurality of passages formed therein for connecting said pairs of ports with the pressure chamber and the waste port so that upon rotation of said valve rotor member to various angular positions the master and individual valves are set in a first or normal filtering position of the pilot valve to establish a downward filtering flow through all filters simultaneously, then in a plurality of successive backwashing positions of the pilot valve the master and individual valves are set to establish upward backwash flows through each of the filters in succession and in a third or filter-to-waste position of the pilot valve the master and individual valves are set to establish a downward filtering flow through all the filters simultaneously and to waste, and means for rotating said pilot valve rotor member to said angular positions.

8. A water filter system comprising a plurality of filters arranged in a battery, a rotary multiway master valve controlling flow through all the filters of the battery, individual valves controlling flows through each of the filters, fluid pressure means for operating each of said individual valves, a pilot valve for each of said pressure means controlled by electrical means, an electric motor for operating said rotary master valve, a common control circuit for said motor and said electrical pilot control means, a rotary circuit breaker connected in said control circuit and having an operative connection with said rotary master valve and additional rotary electric timing motor means with rotary switch means connected in said circuit and in electrical series with said circuit breaker to start and stop the master valve motor and to energize and deenergize said pilot valve control means so that both the master valve and the individual valves are first set to filter water downwardly through all filters of the battery and to service and then said master valve and individual valves are set to pass water upwardly for backwashing each of the filters in succession for respective times determined by said rotary timing motor and switch means.

9. A water filter battery system under coordinated automatic operation and control comprising a plurality of filtering units arranged in a battery, master valve means controlling flow through the battery as a whole, a plurality of other valve means respectively controlling flows through the individual units of the battery, power means actuating the master and individual valve means and electrical timing control means for said power means comprising a control circuit, rotary circuit making and breaking means in said control circuit and operated by said power means and a plurality of rotary motor operated time control switch means connected in said control circuit in electrical series with said circuit making and breaking means and adapted to energize and deenergize said valve actuating power means at predetermined times.

10. A water filter battery system under coordinated automatic operation and control comprising a plurality of filtering units arranged in a battery, master valve means controlling flow through the battery as a whole, a plurality of other valve means respectively controlling flows through the individual units of the battery, power means actuating the master and individual valve means and electrical timing control means for said power means comprising a control circuit, rotary circuit making and breaking means in said control circuit and operated by said power means and timing motor and switch means in electrical series with said circuit making and breaking means and timing said valve-actuating power means.

ERIC PICK.